United States Patent [19]

Bozhko et al.

[11] Patent Number: 4,826,541
[45] Date of Patent: May 2, 1989

[54] METHOD OF THERMAL DEBURRING OF METAL PARTS

[75] Inventors: Valery P. Bozhko; Vitaly E. Strizhenko; Sergei G. Kushnarenko; Alexei V. Losev, all of Kharkov, U.S.S.R.; Vadim G. Kononenko, deceased, late of Kharkov, U.S.S.R., by Tamara I. Kononenko, executrix

[73] Assignee: Kharkovsky Aviatsionny Institut Imeni N.E. Zhukovskogo, Kharkov, U.S.S.R.

[21] Appl. No.: 165,269

[22] PCT Filed: Apr. 30, 1986

[86] PCT No.: PCT/SU86/00039
§ 371 Date: Feb. 11, 1988
§ 102(e) Date: Feb. 11, 1988

[87] PCT Pub. No.: WO87/06512
PCT Pub. Date: Nov. 5, 1987

[51] Int. Cl.⁴ ............................................. B23K 7/06
[52] U.S. Cl. ..................................... 148/9 R; 266/51
[58] Field of Search ................. 148/9 R, 9.5; 266/51, 266/48, 251, 261; 432/159, 197, 205

[56] References Cited
U.S. PATENT DOCUMENTS

| Re. 29,408 | 9/1977 | Geen et al. | 148/9 R |
| 1,186,162 | 6/1916 | Bauer | 148/9 R |
| 3,475,229 | 1/1969 | Geen et al. | 148/9 |
| 3,608,879 | 9/1971 | Birr et al. | 266/51 |
| 3,645,521 | 2/1972 | Geen et al. | 266/249 |
| 3,666,252 | 5/1972 | Rice | 266/249 |
| 3,901,488 | 8/1975 | Riddle | 266/249 |
| 4,394,007 | 7/1983 | Leisner | 148/9 R |

Primary Examiner—Scott Kastler
Attorney, Agent, or Firm—Lilling & Greenspan

[57] ABSTRACT

A method of thermal deburring of metal parts which is carried out in a chamber in two stages. The chamber is initially filled with a mixture of a combustible gas and air, the amount of each component in the mixture and the pressure thereof being dependent on the necessity to ensure the burning-out of oils and evaporation of moisture from the surface of parts being treated. The mixture is subsequently ignited. As a result, the moisture evaporates, and the oils burn out. Products of combustion are then expelled from the chamber. Then the chamber is filled with a mixture of a combustible gas and oxygen and the mixture is ignited, and the burrs on the parts are burnt down.

1 Claim, 1 Drawing Sheet

METHOD OF THERMAL DEBURRING OF METAL PARTS

BACKGROUND OF THE INVENTION

1. Field of the Invention

The present invention relates to methods of deburring of parts, and more specifically, to methods of thermal deburring of metal parts.

2. Description of the Prior Art

Known in the art is a method of thermal deburring of metal parts, wherein the parts being treated are placed in a chamber, the latter is filled with a mixture of a combustible gas and oxygen, the amount of each component in the mixture and its pressure being dependent on the material and dimensions of parts being treated, and the mixture is subsequently ignited (cf. U.S. Pat. No. 3,475,229, class 148-9, published Oct. 28, 1969; USSR Inventor's Certificate No. 615,094, class B23K 28/00, published July 25, 1978).

Using the above method, it is necessary to perform an additional operation to degrease and remove moisture from the surface of the parts being treated prior to placing them in the chamber. This operation has been necessitated by the fact that oils on the surface of parts combined with oxygen are conducive to uncontrollable combustion of the combustible gas and oxygen in the chamber, which interferes with the process of treatment.

Moisture on the surface being treated results in a drastic increase in the energy required to remove the burrs, because part of the energy is spent on evaporation. As to the operation to degrease and dry the surface of parts, it is rather labour-consuming and toxic. Moreover, the operation in question calls for a separate workplace provided with relevant machinery.

SUMMARY OF THE INVENTION

The present invention is aimed at providing a method of thermal deburring of metal parts according to which parts in a chamber are treated in such a way that it is possible to eliminate labour consuming and toxic operations of degreasing and drying surfaces of parts being treated and uncontrollable ignition in the chamber of mixture of a combustible gas and oxygen.

The invention substantially resides in a method of thermal deburring of metal parts, wherein the parts being treated are placed in a chamber, the latter is filled with a mixture of a combustible gas and oxygen, the amount of each component in the mixture and the pressure thereof being dependent on the material and dimensions of parts being treated, and the mixture is ignited according to the invention, which presupposes that prior to being filled with a mixture of a combustible gas and oxygen the chamber is filled with a mixture of a combustible gas and air, the amount of each component and the pressure of the latter mixture being dependent on the necessity to ensure the burning-out of oils and evaporation of moisture from the surface of parts being treated, the mixture is ignited to expel oils and moisture from the surface of parts, and the products of combustion are subsequently removed.

The proposed method of thermal deburring of metal parts allows labour conditions to be improved, the quantity of additional equipment to be reduced, and interference with the parts treatment process to be avoided.

BRIEF DESCRIPTION OF THE DRAWINGS

Further the present invention will become more fully apparent with reference to specific embodiments thereof taken in conjunction with the accompanying drawings, wherein.

DESCRIPTION OF THE BEST MODE FOR CARRYING OUT THE INVENTION

Figure 1:
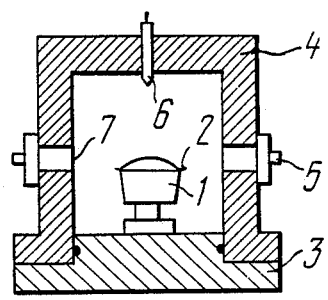
FIG. 1 illustrates a chamber for thermal deburring of metal parts to implement a method for thermal deburring of metal parts, according to the invention (longitudinal section)
Figure 2:
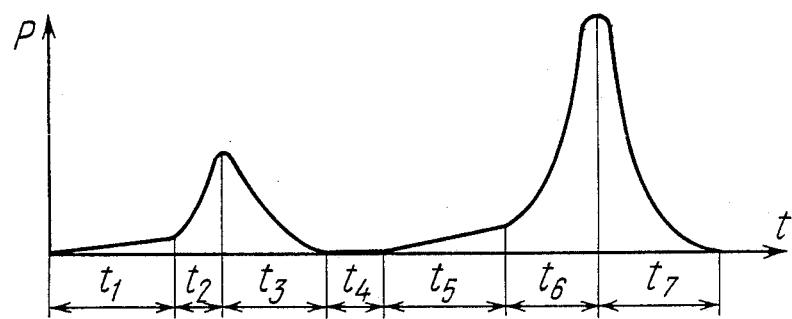
FIG. 2 is a diagram of the variations of the pressure in the chamber, depending on the time, and explaining the method, according to the invention with time t in seconds being plotted on the abscissa and pressure P in MPa, on the ordinate.

The method of thermal deburring of metal parts, according to the invention, consists in that a part 1 being treated with burrs 2 thereon is placed onto a bottom 3 of a chamber 4. The latter is then filled with a mixture of a combustible gas and air (time interval $t_1$ in FIG. 2), the amount of each component in the mixture and the pressure thereof being dependent on the necessity to ensure the burning-out of oils and evaporation of moisture from the surface of the part 1 being treated (FIG. 1). The mixture is fed into the chamber 4 through an inlet valve 5. Said mixture is ignited in the chamber 4 with the aid of an ignition plug 6 to expel oils and moisture from the surface of the part 1 (time interval $t_2$ in FIG. 2), and the combustion products are removed through an outlet valve 7 (time interval $t_3$ in FIG. 2). The chamber 4 is subsequently blown through with air (time interval $t_4$ in FIG. 2). Following this, the chamber 4 is filled with a mixture of a combustible gas and oxygen through the valve 5 (time interval $t_5$ in FIG. 2), the amount of each component in the latter mixture and the pressure thereof being dependent on the material and dimensions of the part 1 being treated. The mixture is then ignited by means of the ignition plug 6. The high temperature and pressure resulting from the combustion of the gas-oxygen mixture (time interval $t_6$ in FIG. 2) remove the burrs 2 from the part 1. The processed combustion products are discharged into the atmosphere through the valve 7 (time interval $t_7$ in FIG. 2), and the treated part 1 is taken out of the chamber 4.

The table below shows specific examples of the method, according to the invention.

TABLE

| Nos | Material of part being treated | Content of elements in mass percent | | | | | | |
|---|---|---|---|---|---|---|---|---|
| | | C | Si | Mn | Fe | Cu | Zn | Al |
| 1 | Steel | 0.45 | 0.2 | 0.6 | balance | — | — | — |
| 2 | Brass | — | — | — | — | 60 | 40 | — |
| 3 | Aluminium alloy | — | 5.0 | 0.3 | 1.2 | 2.5 | 0.3 | balance |

| Nos | Dimensions, mm | Mixture of combustible gas and air, pressure in MPs | | Mixture of combustible gas and oxygen, pressure in MPa | |
|---|---|---|---|---|---|
| | | $CH_4$ | air | $CH_4$ | $O_2$ |
| 1 | 50 × 50 × 100 | 0.04–0.08 | 0.4–0.8 | 0.25–0.10 | 0.8–3.0 |
| 2 | 50 × 50 × 100 | 0.04–0.06 | 0.4–0.6 | 0.25–0.50 | 0.8–1.5 |
| 3 | 50 × 50 × 100 | 0.02–0.04 | 0.2–0.4 | 0.15–0.30 | 0.5–1.0 |

The method of thermal deburring of metal parts, according to the invention, ensures a high quality of deburring, obviates the necessity for performing additional labour-consuming and toxic operations to degrease the surface of parts and remove moisture therefrom, and makes it possible to attain the stability of the deburring process by preventig uncontrollable self-ignition of a mixture of a combustible gas and oxygen in the chamber.

The invention may be used to advantage at machine-building enterprises to deburr metal parts.

We claim:

1. A method of thermal deburring of metal parts, comprising the steps of placing the parts being treated into a chamber; filling the chamber with a mixture of a combustible gas and air, the amount of each component and the pressure of the latter mixture being dependent on the necessity to insure the burig-out of oils and evaporation of moisture from the surface of the parts being treated; igniting the gas and air mixture to expel oils and moisture from the surface of parts; removing the products of combustion; filling the chamber with a mixture of a combustible gas and oxygen, the amount of each component of the mixture and the pressure thereof being dependent on the material and the dimensions of parts being treated; and igniting the gas and oxygen mixture to effect deburring.

* * * * *